US011204810B2

(12) United States Patent
Wilson

(10) Patent No.: US 11,204,810 B2
(45) Date of Patent: Dec. 21, 2021

(54) JOB CONCENTRATION SYSTEM, METHOD AND PROCESS

(71) Applicant: Eric Cameron Wilson, Benloch (AU)

(72) Inventor: Eric Cameron Wilson, Benloch (AU)

( * ) Notice: Subject to any disclaimer, the term of this patent is extended or adjusted under 35 U.S.C. 154(b) by 865 days.

(21) Appl. No.: 15/572,503

(22) PCT Filed: May 9, 2016

(86) PCT No.: PCT/AU2016/000161
§ 371 (c)(1),
(2) Date: Nov. 8, 2017

(87) PCT Pub. No.: WO2016/179636
PCT Pub. Date: Nov. 17, 2016

(65) Prior Publication Data
US 2018/0107522 A1      Apr. 19, 2018

(30) Foreign Application Priority Data

May 8, 2015    (AU) ................................ 2015901683

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 9/505* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 2005/0120160 A1* | 6/2005 | Plouffe | G06F 9/4856 711/1 |
| 2011/0167421 A1* | 7/2011 | Soundararajan | G06F 9/45533 718/1 |
| 2012/0233610 A1* | 9/2012 | Mandre | G06F 9/4856 718/1 |
| 2016/0170785 A1* | 6/2016 | Liguori | G06F 9/5027 718/1 |
| 2017/0286143 A1* | 10/2017 | Wagner | G06F 9/45558 |

* cited by examiner

*Primary Examiner* — Kaveh Abrishamkar

(57) ABSTRACT

Data processing jobs are concentrated into instances of computing environments which instances are added to guarantee availability, while other instances may become idle and removed. Such data processing jobs are each assigned to a program running on (at least) one processor, while at the same time running such jobs in the smallest practical number of Virtual Computing Environments, while also ensuring sufficient Virtual Computing Environments are on standby for new jobs as they arise, while facilitating maintenance functions.

15 Claims, 6 Drawing Sheets

JOB CONCENTRATION SYSTEM, METHOD AND PROCESS

FIELD OF THE INVENTION

Figure 1:
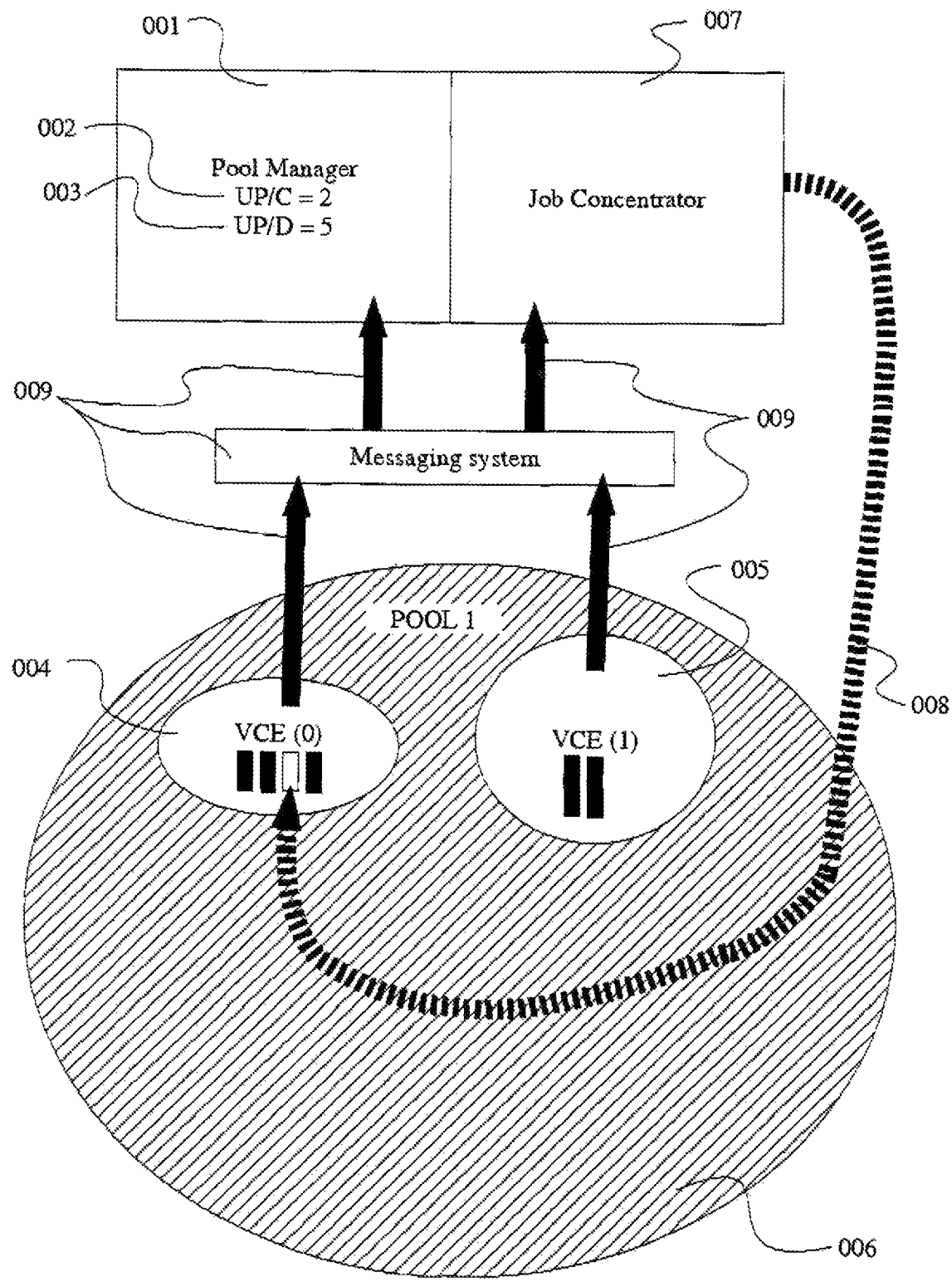

The invention resides in the field of data processing. Further, and without limitation, the invention may also have particular application to document reformatting. The invention may also have particular application to data compression.

BACKGROUND TO THE INVENTION

To understand the invention it is necessary to appreciate the interrelationships between technologies in computing environments. Computing environments have (from the 1970's at least) traditionally consisted of a combination of hardware (electronics) and software (computer programs).
Hardware:

Hardware included central processing unit(s) (CPUs) and storage such as random access memory and/or read-only memory and/or hard disk drive(s). This is still the case in today's computing environments, although hard disks are being replaced by solid state storage. Keyboards, screens, printers and micro computers with integrated circuits in computing environments appeared in the 1970's The 1980's saw the emergence of networking protocols by which programs on different computers could interact with each other.

By the early 1990's a computing environment's hardware also often included additional input/output such as optical drives, network interface(s), and/or mouse (or other pointing device). Usually, upon start-up, operating system software that was installed (that is copied and configured for use in the computing environment) on a storage device was loaded into memory to help manage the hardware and offer common services to application software; after which such application software was launched to perform tasks for end users. Inter-networking hardware such as routers and switches allowed computer networks to be combined to form the Internet Protocol networks. Such is typical of micro-computing environments today, which people commonly experience using PCs, notebooks, tablets or smartphones.
Software:

Typically, more than one application can be run in a computing environment at the same time, particularity if the environment has more than one CPU and/or CPU 'core' (henceforth collectively referred to as 'processor(s)'), as most do today. An operating system's scheduler program allocates applications to processor(s) and other resources. Applications can be scheduled including according to how important they are, how long they have been waiting in a queue, and which processor(s) is the most free to process the information, for example.

Such application software can execute in several ways. For example, with procedural programming, processing consists of a series of steps executed in a certain order. However in the 1990's, object oriented programming became popular. Objects encapsulate programming steps to form programming objects which interact with other such objects through interfaces. Objects can be event driven, rather than executed in a predetermined order. For example, if the objects are buttons on a screen, they might only react when pressed by an end-user, in an order which the application does not know in advance, since the order of the buttons being pressed is decided by the end-user.

It also became popular in the mid-1990's to divide computing work between computers. This often took the form of a 'client' and 'server' computing environment. For example a client would request or transact with a server to obtain information to display to a user: A database client could send a query to a database server located on another computer via a computer network, and the server would process the query and send the results back to the client. Another example would be a Web browser on a client computer sending a request to a Web server on a server computer for a Web page: The Web page might be fetched or created by the Web server and sent to the Web browser via the internet for assembly and display to the user. Optionally, the Web browser might also perform further processing of the Web page sent by the Web server by interpreting and executing JavaScript programs embedded in the Web page.

Software objects could also be coded to interact with one another via a computer network: For example a client object could query a server object which could in tern query several database servers for the required information. Information retrieved from the databases could for example, be combined and/or calculated and/or sorted by the server object so that the client only was sent the information it needed and in a form it could use. Whereas a client/server application architecture formed a two-tier computing environment, applications divided into presentation clients/business logic servers/data storage servers formed multi-tier computing environments. A multi-tier environment had the advantage of allowing the presentation client software to be changed without affecting the other tiers and visa-verse, thus reducing costs and increasing reuse of the software in different contexts. For example, by the late 1990's it became apparent that using a Web pages for the presentation tier (which required Web servers and browsers) reduced the need to install and maintain client applications on client computers. This is often because Web pages are downloaded from Web servers as required. Thus many modern computing environments consist for example, of a combination of Web browsers connected to Web servers connected to business logic software objects connected to information repositories of various kinds such as email servers and database servers; with the connections often being via network or internet links.

With the increasing use of Web pages, the need to split the workload between different servers within a computing environment also increased. This task is typically performed by one or more load balancers, (implemented as either hardware or software) using somewhat similar techniques to those employed by operating system schedulers. Sometimes load balancing involves simpler methods, such as simply allocating resources to tasks in a round robin between multiple servers. Thus load balancing (as software or embedded in hardware) was also added to many computing environments.

As computing environments such as those discussed above became more common in the mid-1990's, it also became popular to create software objects using the Java programming language which was designed to work better with Web pages and networks. Java programs run in a Java virtual machine rather than directly on a computer's own hardware. A virtual machine is a software program which executes the Java instructions of an application and adapts them to the underlying operating system and hardware. Writing applications as objects to run in a virtual machine meant that computer programmers did not need to worry so much about the intricacies and idiosyncrasies of different operating systems and/or hardware combinations in a computing environment. By the late 1990's computers with multiple CPUs became more common and one computer could host many instances of virtual machines.

Of course encapsulating programs as objects which communicate with other objects through interfaces, and running these in virtual machines located on client and a server computers connected via a computer network, can be slower to execute than procedural code running in a monolithic computing environment. However, object pooling can allow a client object to request access to a server object from a pool of server object instances that are already up and running, having been previously initiated. This arrangement allows high speed processing because the client does not need to wait until the server object is created (such as scheduled by an operating system) before processing can occur, but merely connect to an existing object in the pool instead. The number of objects in a pool waiting for connections can be governed by a pool manager, and is often set to a default and expanded or reduced as the number of connections by client objects fluctuate. Such server objects will often be written in programming languages such as Java or Microsoft's .NET languages, and run in virtual machines on operating systems such as Linux or Microsoft Windows.

However, the provision of virtual machines for the running (hosting) of software objects designed to run in them is only one aspect of virtual computing. Virtual machines can also host operating systems as if those operating systems were running on actual hardware. For example, the Commodore 64 computer has been out of production for over 20 years, however its programs can still be run today using a Java app that emulates the obsolete system within the Java virtual machine. Likewise LXC (as a basis of "containerisation") running on a Linux operating system is a contemporary example of the principle of virtual computing using an emulator. Taking the concept of virtualisation a step further, virtual management software, known as hypervisors, can run a number of virtual environments on for example, a single micro-computing environment. For example, using Virtual Box software by Oracle Corporation, one could run a Ubuntu Linux workstation and access it within a window of a Microsoft Windows 8.1 micro computing environment. Another window in that same environment might access a Virtual Box containing a virtualised Apple Machintosh OSX micro-computing environment. Of course, each virtualised (guest) environment will require resources from its physical (host) computing environment. So if one runs more than a few guest computing environments on a microcomputer host environment, performance issues may arise.

Pooled Resources:

A large mainframe computing environment might also run virtualisation software to host many micro-computing environment guests without performance problems. Likewise parallel processing using 'grid computing'. However by the early 2000's it became clear that the economics of mass production favoured a micro-computer "server farm" approach because it's cheaper to buy dozens, hundreds or even thousands of commodity micro-computers and network them together (known as "scaling out") than it is to build a smaller number of large computers comprising many integrated processors (known as "scaling up"). Scaled-out server farms hosting a large number of virtual micro-computing environments form the basis of what is known as "cloud computing".

Cloud computing provisions virtual micro-computing environments (such as to run virtual machines/operating system emulators for example) under the control of hypervisors and other management software. This allows new virtual micro-computing environments to be created on existing hardware that are ready for use within minutes or even a second or two. Such virtual micro-computing environments can be rented by the month or by the hour for example. And when one virtual micro-computing environment approaches full utilisation, it can be automatically cloned by a hypervisor and added to a virtual computing environment pool to provide more capacity. In this case, requests or connections to applications in the virtual environment pool may be directed to different instances of a virtual micro-computing environment within that pool, by way of load balancing mechanisms such as previously described. Likewise, instances can be removed from the pool when no longer required. This means the physical server farm can provide for more users as decreased virtualised demand from one user allows room for another, allowing economies of scale and increased hardware utilization. Further, centralisation and ammortisation of computing cost also allows even the smallest micro-computing environment to be professionally managed. Thus cloud computing can significantly reduce costs when compared with traditional computing environments.

However performance issues may arise with cloud computing when different virtual guest environments, particularly when used by different 'tenant' customers of a cloud, fight for the resources of their host's "bare metal" environment. This is known as a noisy neighborhood. One answer is to have "private" virtual environments which run on bare metal dedicated to a particular tenant customer. In this manner, the advantages pool management such as cloning or scripted creation of virtual computing environments can be achieved while optimizing performance. The disadvantage of course, is the customer looses the previously mentioned economies of resource aggregation in a "public" cloud.

Most of the noise encountered by programs running in a virtual machine hosted in a public cloud is caused by activities in other virtual machines in the electronic neighborhood that heavily use widely shared resources—such as mass storage and networking. Such noise is not such a problem in relation to closely held resources—such as processors or random access memory. For the good of the neighborhood, noisy tenants in a public cloud may be required by a cloud service provider to relocate to a private cloud; which is more expensive for the customer due to the reduction of economies of scale achieved though a public cloud's resource aggregation.

However, the way aggregation works in clouds—be they public or private—differs to the way software object pools (as previously described) are utilized. This is because a hypervisor hosts a computing environment largely by providing an emulation suited to the virtualised computing environment, whereas software objects are written and assembled to suit the virtual machine in which they will run. In other words, in virtual computing, hosts largely cater for the needs of guests, whereas in object computing, the opposite premise applies—software objects are largely written to run in the environment in which they are intended to execute.

This means for example, that when executing within a virtualised computing environment, applications written for micro-computing environments are often somewhat isolated from the "bare metal" of the physical host environment underlying the guest virtual computing environment. This is true even though extensions can be provided to assist integration between virtualised and physical hardware. The hypervisor may thus remain blissfully ignorant of the needs of the applications executing within a virtualised operating system.

A software object pool manager on the other hand, may detect when a new instance of an object needs to be instantiated according to the utilisation of the existing pool of objects; while a load balancer directing requests or connections to an instance of a virtualised environment is unable to reach that level of granularity. The load balancer may be able to monitor processor utilisation, or network usage—but this is generally without reference to the data processing occurring on those processors or using that network.

There is another fundamental difference between server software objects created for virtual machines which are pooled, and independent server applications run in a virtualised computing environment: Usually, the server software object in the pool will interact with a client object via a connection, whereas an independent application, such as an email or Web server, might interact with its client via a transaction. For example, in a transactional system, a Web browser client might send a Web server a request for a Web page and the Web server will then send the page and wait for the next request from any Web browser. In a connection-based system, a connection with a server object is established and like a phone call, the client and server objects may engage in conversations until one of them hangs up. Consequently, maintaining a connection requires much more computing environment resources than processing a transaction.

By way of further example, broadly speaking, with a pool of guest operating system instances, a Web page request will be directed by a load balancer to a Web server running on one of the guest operating system instances. The requested resources comprising the Web page are then fetched or created and sent back to the requester (e.g. a Web browser) and the system waits for the next request. The load balancer(s) make sure requests are distributed between guest operating system instances so that one does not become overloaded. With such Web requests, the requestor simply waits in a queue to be served when the Web server is good and ready to answer the request. For example, it is generally beyond the capability of the HTTP protocol for one Web browser to lock out another so that its request is performed first (although different types of content can be prioritised by network load balancing, this is not Web-page specific).

With an object pool on the other hand, a client object is coupled with a server object and it's often up to the client object to release the server object when it is finished using it. So conceptually, a client takes an object from the pool and returns it to the pool for reuse; meanwhile the server object belongs to the client object—whereas a server on the operating system, such as a Web or email server, can perform services for a client without being exclusively tied to it. But when an instance of an operating system is running a pool of objects, that operating system instance cannot be safely shut down until all objects in the pool are released by their clients, or at least transferred to another operating system to which their clients are redirected.

Operations:

It can be seen from the above discussion that object based pools are resource intensive, whereas pools of operating systems running servers may be less so for a given amount of processing. It can also be seen that there is a fundamental difference between requesting a connection to an object and requesting a resource from a server. Thus management of pools of objects are largely based upon a required number of connections, whereas management of pools of servers and their operating systems is based largely on the amount of processing or throughput required. Therefore the number of operating systems in a pool may be scaled for efficiency or availability according to a percentage of processor and/or network utilisation over time, for example. On the other hand, the number of objects in a pool may be scaled for efficiency or availability according to the number of connections requested over time. As previously stated, the two types of pools are different, yet complimentary, such that the resizing of a software object pool may well trigger the resizing of the operating system pool in which the object pool is located. This means if one wants guaranteed performance for a particular kind of data processing, it can be implemented as an object in a pool. If one desires more efficiency, it can be implemented as a service run in an operating system instance.

While such arrangements may suit many cases there are times when implementing a particular kind of data processing as an object in a pool is very inconvenient. For example, a particular system may not be readily available in object form or may be uneconomic to create or recreate in object form. This becomes problematic when both maximum availability and performance is required, because the parameters used to scale operating systems such as processor and network utilisation over time apply an aggregate measure to what must be guaranteed for a specific job. Even when these aggregate measures are used to trigger the provision of a new virtual machine, it could take minutes for the scripts to execute or cloning to happen before the increased processing capacity becomes available. With private clouds, provisioning delays are even worse, with it normally taking hours or even days before the underlying bare metal systems become available. On the other hand, the use of such aggregate measures to shut inactive virtual machines down, may not leave enough spare processing capacity to instantly handle a surge of new data processing jobs.

An example where this problem may occur is with content reformatting, where fast throughput is required for a user waiting to be sent the content: On the one hand, it would be highly inefficient for thousands of users to each have their own connection, particularly over the internet where connections can come and go. On the other hand, users must receive reformatted content within a few seconds—way faster than it takes to provision another operating environment if all others are busy. In such a scenario a document or portion of a document may maximise the use of one or more processors, because the work is usually processor-bound rather than held up by storage or network performance such as in a noisy environment.

In 2002, Document Display System and Method (WO/2003/052582) specified that long documents could be split into shorter sections for reformatting and then recombined for display. It follows this would allow a reformatting to occur in parallel using several processors. Thus long documents may be determined to be candidates for multi-processor processing if the computing cost of splitting the job was worth the performance gains of having multiple processors working on the job. In addition, the aforementioned Document Display System and Method also specified that documents could contain scripts and other documents, further complicating the issue of processing such jobs.

Of course job flow issues are not new. The nearest type of problem to the one described above arose in computer science during the 1960s and 1970s, albeit on a much smaller scale. It occurred when a queue of jobs had to be split between several computers: The question was which jobs should be run on which computers to both minimize computer idle time while also minimising the waiting time before each job had been completed? Known as "flow shop scheduling", it is believed no algorithm was found which guarantees an optimum resolution of these two requirements. Furthermore, such flow shop scheduling assumes a known number of jobs of known length being processed by a known number of computers; whereas the modern scheduling challenge must cope with unknown numbers of jobs of unknown sizes being processed by fluctuating numbers of virtual computing environments—whereby processing is ongoing in real-time rather than run in batches overnight for example.

The problem is further complicated by maintenance issues. For example, ongoing sustainability of cloud computing relies on patch management. When faults or security concerns require a software update to "patch" an operating system or application in a virtual computing environment, this may require freshly patched virtual computing environments to be put into the pool while older virtual computing environments and their cloned instance(s) need to be discontinued. Similar issues arise when part of a virtual computing environment needs to be upgraded with new features. Somehow, such maintenance needs to be performed without interrupting the flow of jobs processed by a pool of virtual computing environments.

Further, software is almost always imperfect, which means that over time, and also with use, resources used by operating systems and applications might become unnecessarily locked up or lost track of. Thus it is prudent to 'cycle' (restart or re-create) parts of or whole computing environments. This too needs to be conducted without interrupting the flow of jobs processed by a pool of virtual computing environments expected to be operational at all times.

What is needed is an automated way of providing object pool-like guarantees to jobs handled by applications running within in one or more pools of virtual computing environments, which can take advantage of the economies and benefits of cloud computing's scaling out and aggregation, while also taking into account maintenance issues and the need to cycle such systems over time while maintaining continuous throughput; and all this needs to be achieved while keeping the noise down so as to avoid the expense of high performance private clouds and the delays of bare metal provisioning.

DESCRIPTION OF THE INVENTION

It is an object of the invention to provide efficient high-performance processing by concentrating jobs into instances of computing environments which instances are added to guarantee availability, while other instances may become idle and removed. Further objects will be evident from the following description:

For ease of explanation, in the system, method and process described below, the term "Virtual Computing Environment" can also refer to a cloned instance of that virtual computing environment. Thus a plurality of Virtual Computing Environments could be a particular virtual computing environment and its clone(s), or several different virtual computing environments and may also include their clone(s). Likewise the term "Pool" means one or more pools of such Virtual Computing Environments. The employment of these terms is intended to enhance the readability of this specification and where technically possible, not limit the invention to a single rendering of any of them.

In a preferred embodiment, the invention ensures data processing jobs are each assigned to a program running on (at least) one suitable processor for high performance, while at the same time running such jobs in the smallest practical number of Virtual Computing Environments, while also ensuring sufficient Virtual Computing Environments are on standby for new jobs as they arise, while facilitating maintenance functions.

Although not its only form or indeed its broadest form, the invention resides in a system for managing one or more Pools of Virtual Computing Environments and distributing jobs to a plurality of Virtual Computing Environments, comprising:

at least one Pool Manager means for causing the creation or addition (or both) of one or Virtual Computing Environments to be included in said Pool, with said creation/addition function(s) triggered when the number of under-utilised processors in said Pool is less than a threshold for such under-utilised processors; and one or more Job Concentrator means which allocates jobs to said Virtual Computing Environments in said Pool, whereby said allocation is made to a Virtual Computing Environment having one or more under-utilised processors, with said allocation made in an order of priority from the latest added said Virtual Computing Environment, to the earliest added said Virtual Computing Environment; and at least one Pool Manager means that can cause the destruction or removal (or both) of said Pool's earliest added Virtual Computing Environment in which every processor is under-utilised and not processing any jobs, wherein said destruction/removal function(s) triggered when the number of under-utilised processors in said pool is more than a threshold for such under-utilised processors; and wherein an under-utilised processor is a processor within a Virtual Computing Environment that is able to process a job that does not have a job or that has a amount of free time predetermined or calculated as being enough to process one or more additional jobs; and wherein a said threshold of under-utilised processors may be described as a number or certain numbers of said under-utilised processors or comprise a range of numbers of said under-utilised processors.

In a preferred embodiment, one or more said Job Concentrator means may be informed by one or more Monitor means running in one or more said Virtual Computing Environments, as to the progress of jobs already allocated, so that no further Jobs are allocated to any Virtual Computing Environment that is performing poorly including relative to how other Virtual Computing Environments in said Pool are performing.

In another preferred embodiment, one or more said Job Concentrator means or said Pool Manager means may monitor and enforce a quota of Jobs upon one or more said Virtual Computing Environments, so that when a said Virtual Computing Environment's said jobs quota is reached, no further Jobs are allocated to that Virtual Computing Environment; and the said Job Concentrator means causes a new Virtual Computing Environment to be created/added to the said Pool; and the said Job Concentrator means or Pool Manager means causes that Virtual Computing Environment which has reached its said jobs quota to be removed/destroyed from the said Pool when all Job processing in that Virtual Computing Environment is done.

In another preferred embodiment, one or more said Job Concentrator means or said Pool Manager means may monitor and enforce a time limit upon one or more said Virtual Computing Environments, so that when a said Virtual Computing Environment's said time limit is reached, no further Jobs are allocated to that Virtual Computing Environment; and the said Job Concentrator means or Pool Manager means causes a new Virtual Computing Environment to be created/added to the said Pool; and the said Job Concentrator means or Pool Manager means causes that Virtual Computing Environment which has reached its said time limit to be removed/destroyed from the said Pool when all Job processing in that Virtual Computing Environment is done.

In another preferred embodiment, one or more said Pool Manager means may be informed by one or more Monitor means running in one or more said Virtual Computing Environments, as to the progress of jobs therein, so that a Job in any Virtual Computing Environment that is performing poorly (including relative to how other jobs in other Virtual Computing Environments in said Pool are performing) can be terminated.

In another preferred embodiment, one or more said Pool Manager means may be informed by one or more Monitor means running in one or more said Virtual Computing Environments, as to the progress of jobs therein, or of the performance of that Virtual Computing Environment, so that a Virtual Computing Environment that is performing poorly (including relative to how other jobs and/or how other Virtual Computing Environments in said Pool are performing) can be removed or destroyed (or both) by said Pool Manager means.

In another preferred embodiment, at least one Pool Manager means can cause the creation/addition (or both) of one or more Virtual Computing Environment(s) to be included in said Pool, with said creation/addition function(s) operated under manual control.

In another preferred embodiment, at least one Pool Manager means that can cause the removal/destruction (or both) of one or more Virtual Computing Environment(s) in said Pool, with said removal/destruction function(s) operated under manual control.

In another preferred embodiment, one or more job concentrator means allocates jobs said Virtual Computing Environments in said Pool under manual control.

Optionally, the said Job Concentrator means allocates jobs to Virtual Computing Environments determined or calculated as being suitable for that job. For example, the said Job Concentrator means may allocate jobs suited to be processed by two or more processors, such as larger jobs, to Virtual Computing Environments which have two or more under-utilised processors.

Optionally, a said threshold of under-utilised processors could be represented in consolidated form as a number of under-utilised Virtual Computing Environments in said Pool.

Optionally, the said earliest added Virtual Computing Environment could be confined to a class of Virtual Computing Environments, such as those charged for on an hourly or monthly basis, or of a certain number of processors for example.

Optionally, the said Pool Manager means may determine that a Virtual Computing Environment to be created/added to said Pool should be of a certain class, such as those charged for on an hourly or monthly basis, or of a certain number of processors for example, and not necessarily the earliest Virtual Computing Environment in said Pool.

Optionally, the said job(s) could be reformatting documents. Optionally, the said job(s) could be compressing data.

It will be appreciated that the said threshold for under-utilised processors for the creation/addition of Virtual Computing Environments could be different to the threshold of the under-utilised processors for the removal/destruction of Virtual Computing Environments.

It will further be appreciated that at least one Pool Manager means and at least one Job Concentrator means may form part of an overall management application or be implemented as separate programs.

It will also be appreciated that the said options, example, alternative functions and preferred embodiments of the system could be employed singly or in combination; the separate expressions of which are not intended to limit the invention.

The invention also resides in a method of automatically adjusting the number of Pool-based Virtual Computing Environments, including the steps of:

checking if the number(s) of under-utilised processors is less than the desired threshold for under-utilised processors, and if so, creating a Virtual Computing Environment and adding it to said Pool;

allocating jobs to said Virtual Computing Environments in said Pool, whereby said allocation is made to a Virtual Computing Environment having one or more under-utilised processors, with said allocation made in an order of priority from the latest added said Virtual Computing Environment, to the earliest added said Virtual Computing Environment;

checking if the number(s) of under-utilised processors is more than the desired threshold for under-utilised processors, and if so, removing or destroying the earliest added Virtual Computing Environment in said Pool that is not running any job;

whereby an under-utilised processor is a processor within a Virtual Computing Environment that is able to process a job that does not have a job or that has a amount of free time predetermined or calculated as being enough to process one or more additional jobs; and whereby a said threshold of under-utilised processors may be described as a number or certain numbers of said under-utilised processors or comprise a range of numbers of said under-utilised processors.

In a preferred embodiment, the method includes the further steps of monitoring one or more said Virtual Computing Environments, as to the progress of Jobs already allocated, and allocating no further Jobs to a Virtual Computing Environment that is performing poorly including relative to how other Virtual Computing Environments in said Pool are performing.

In another preferred embodiment, the method includes the further steps of monitoring and enforcing a quota of Jobs upon one or more said Virtual Computing Environments, so that when a said Virtual Computing Environment's said jobs quota is reached, no further Jobs are allocated to that Virtual Computing Environment; and a new Virtual Computing Environment is created/added to the said Pool; and that Virtual Computing Environment which has reached its said jobs quota is removed/destroyed from the said Pool when all Job processing in that Virtual Computing Environment is done.

In another preferred embodiment, the method includes the further steps of monitoring and enforcing a time limit upon one or more said Virtual Computing Environments, so that when a said Virtual Computing Environment's said time limit expires, no further Jobs are allocated to that Virtual Computing Environment; and a new Virtual Computing Environment is created/added to the said Pool; and that Virtual Computing Environment with the said expired time limit is removed/destroyed from the said Pool when all Job processing in that Virtual Computing Environment is done.

In another preferred embodiment, the method includes the further steps of monitoring one or more said Virtual Computing Environments, as to the progress of jobs therein, so that a Job in a Virtual Computing Environment that is performing poorly (including relative to how other jobs in other Virtual Computing Environments in said Pool are performing) can be terminated.

In another preferred embodiment, the method includes the further steps of monitoring one or more said Virtual Computing Environments, as to the progress of jobs therein, or monitoring the performance of one or more said Virtual Computing Environments in said Pool, so that a Virtual Computing Environment that is performing poorly (including relative to how other jobs and/or how other Virtual Computing Environments in said Pool are performing) can be removed or destroyed (or both).

In another preferred embodiment, the method includes the further steps of allowing the creation/addition (or both) of one or more Virtual Computing Environment(s) into said Pool, with said creation/addition function(s) operated under manual control.

In another preferred embodiment, the method includes the further steps of allowing the removal/destruction (or both) of one or more instances of Virtual Computing Environment(s) in said Pool, with said removal/destruction function(s) operated under manual control.

In another preferred embodiment, the method includes the further step of allocating jobs to said Virtual Computing Environments in said Pool under manual control.

Optionally, the said job allocation step allocates jobs to Virtual Computing Environments that are determined or calculated as being suitable for that job. For example, jobs suited to be processed by two or more processors, such as larger jobs, may be allocated to Virtual Computing Environments which have two or more under-utilised processors.

Optionally, a said threshold of under-utilised processors could be represented in consolidated form as a number of under-utilised Virtual Computing Environments in said Pool.

Optionally, the said creation/addition of a Virtual Computing Environment to said Pool may be determined to be of a certain class, such as those charged for on an hourly or monthly basis, or of a certain number of processors for example.

Optionally, the said earliest added Virtual Computing Environment could be confined to a class of Virtual Computing Environments, such as those charged for on an hourly or monthly basis, or of a certain number of processors for example, and not necessarily the earliest Virtual Computing Environment in said Pool.

Optionally, the said job(s) could be reformatting documents. Optionally, the said job(s) could be compressing data.

It will be appreciated that the said threshold for under-utilised processors for the creation/addition of Virtual Computing Environments could be different to the threshold of the under-utilised processors for the removal/destruction of Virtual Computing Environments.

It will also be appreciated that the said options, example, alternative functions and preferred embodiments of the method could be employed singly or in combination; the separate expressions of which are not intended to limit the invention.

In another form, the invention resides in the process of managing the life cycle of Virtual Computing Environments, wherein:
  a Virtual Computing Environment is created and added to the Pool when the number of under-utilised processors is less than a threshold;
  the said Virtual Computing Environment is allocated jobs when it has one or more under-utilised processes and there are no other Virtual Computing Environments in the said Pool also with one or more under-utilised processes that that were added to the said Pool after the said Virtual Computing Environment;
  the said Virtual Computing Environment is removed from the said Pool and/or destroyed when it is the earliest Virtual Computing Environment to have been added to the Pool and when it is not processing any job and when the number of under-utilised processes is more than a threshold.

In a preferred embodiment, the process includes monitoring the said Virtual Computing Environment, as to the progress of jobs already allocated, and allocating no further Jobs to the said Virtual Computing Environment if it is performing poorly including relative to how other Virtual Computing Environments in said Pool are performing.

In another preferred embodiment, the process includes monitoring and enforcing a quota of Jobs upon the said Virtual Computing Environment, so that when the said jobs quota is reached, no further Jobs are allocated to the said Virtual Computing Environment; and a new Virtual Computing Environment is created/added to the said Pool; and the said Virtual Computing Environment which has reached its said jobs quota is removed/destroyed from the said Pool when all Job processing in the said Virtual Computing Environment is done.

In another preferred embodiment, the process includes monitoring and enforcing a time limit upon the said Virtual Computing Environment, so that when the said time limit expires, no further Jobs are allocated to the said Virtual Computing Environment; and a new Virtual Computing Environment is created/added to the said Pool; and the said Virtual Computing Environment with the said expired time limit is removed/destroyed from the said Pool when all Job processing in the said Virtual Computing Environment is done.

In another preferred embodiment, the process includes monitoring the said Virtual Computing Environment, as to the progress of jobs therein, so that a job in the said Virtual Computing Environment that is performing poorly (including relative to how other jobs in other Virtual Computing Environments in said Pool are performing) can be terminated.

In another preferred embodiment, the process includes monitoring the said Virtual Computing Environment, as to the progress of jobs therein, or monitoring the performance of the said Virtual Computing Environment, so that if the said Virtual Computing Environment is performing poorly (including relative to how other jobs and/or how other Virtual Computing Environments in said Pool are performing) it can be removed or destroyed (or both).

In another preferred embodiment, the process includes allowing the said creation/addition (or both) of the said Virtual Computing Environment into said Pool, with said creation/addition function(s) operated under manual control.

In another preferred embodiment, the process includes allowing the removal/destruction (or both) of the said Virtual Computing Environment(s) in said Pool, with said removal/destruction function(s) operated under manual control.

In another preferred embodiment, the process includes allocating jobs to the said Virtual Computing Environment in said Pool under manual control.

Optionally, in the said process one or more jobs are allocated to the said Virtual Computing Environment based upon its suitability to perform said jobs. For example, jobs suited to be processed by two or more processors, such as larger jobs, may be allocated to the said Virtual Computing Environment when it has two or more under-utilised processors.

Optionally, a said threshold of under-utilised processors could be represented in consolidated form as a number of under-utilised Virtual Computing Environments in said Pool.

Optionally, the said creation/addition of a Virtual Computing Environment to said Pool may be determined to be of a certain class, such as those charged for on an hourly or monthly basis, or of a certain number of processors for example.

Optionally, determination of the said earliest Virtual Computing Environment could be from class of Virtual Computing Environments, such as those charged for on an hourly or monthly basis, or of a certain number of processors for example, and not necessarily the earliest Virtual Computing Environment in said Pool.

Optionally, the said job(s) could be reformatting documents. Optionally, the said job(s) could be compressing data.

It will be appreciated that the said threshold for under-utilised processors for the creation/addition of Virtual Computing Environments could be different to the threshold of the under-utilised processors for the removal/destruction of Virtual Computing Environments.

It will also be appreciated that the said options, example, alternative functions and preferred embodiments of the process could be employed singly or in combination; the separate expressions of which are not intended to limit the invention.

DESCRIPTION OF THE INVENTION RELATED TO THE DRAWINGS

Drawings are provided to assist in understanding the invention. It will be appreciated however, that these are not intended to limit the scope of the invention as described above but to further illustrate how it can be implemented.

In FIGS. 1, 2, 3 and 4 of the drawings appended to this specification are shown concept diagrams exemplifying the invention as residing in a system.

Figure 5:
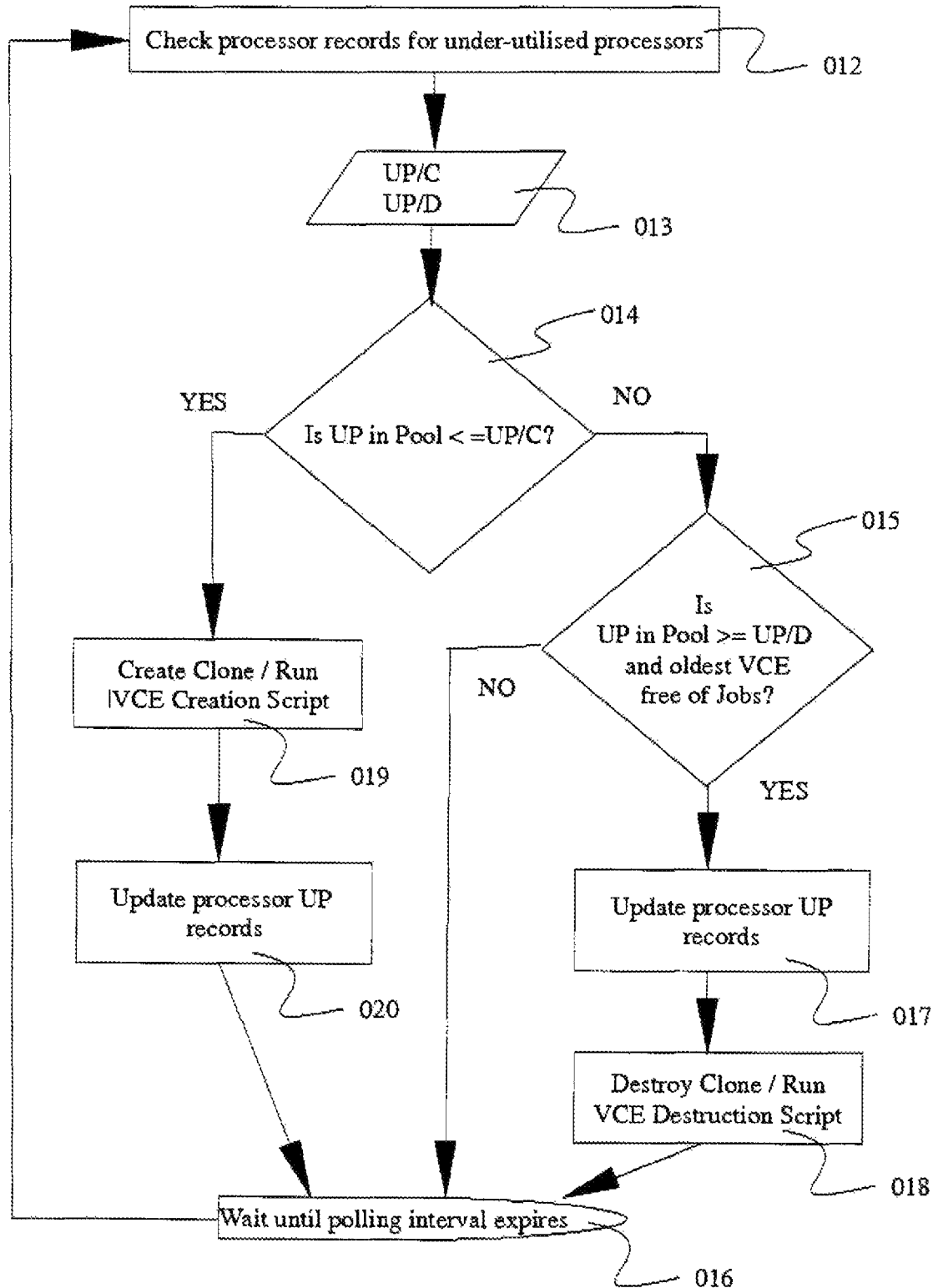
Figure 6:
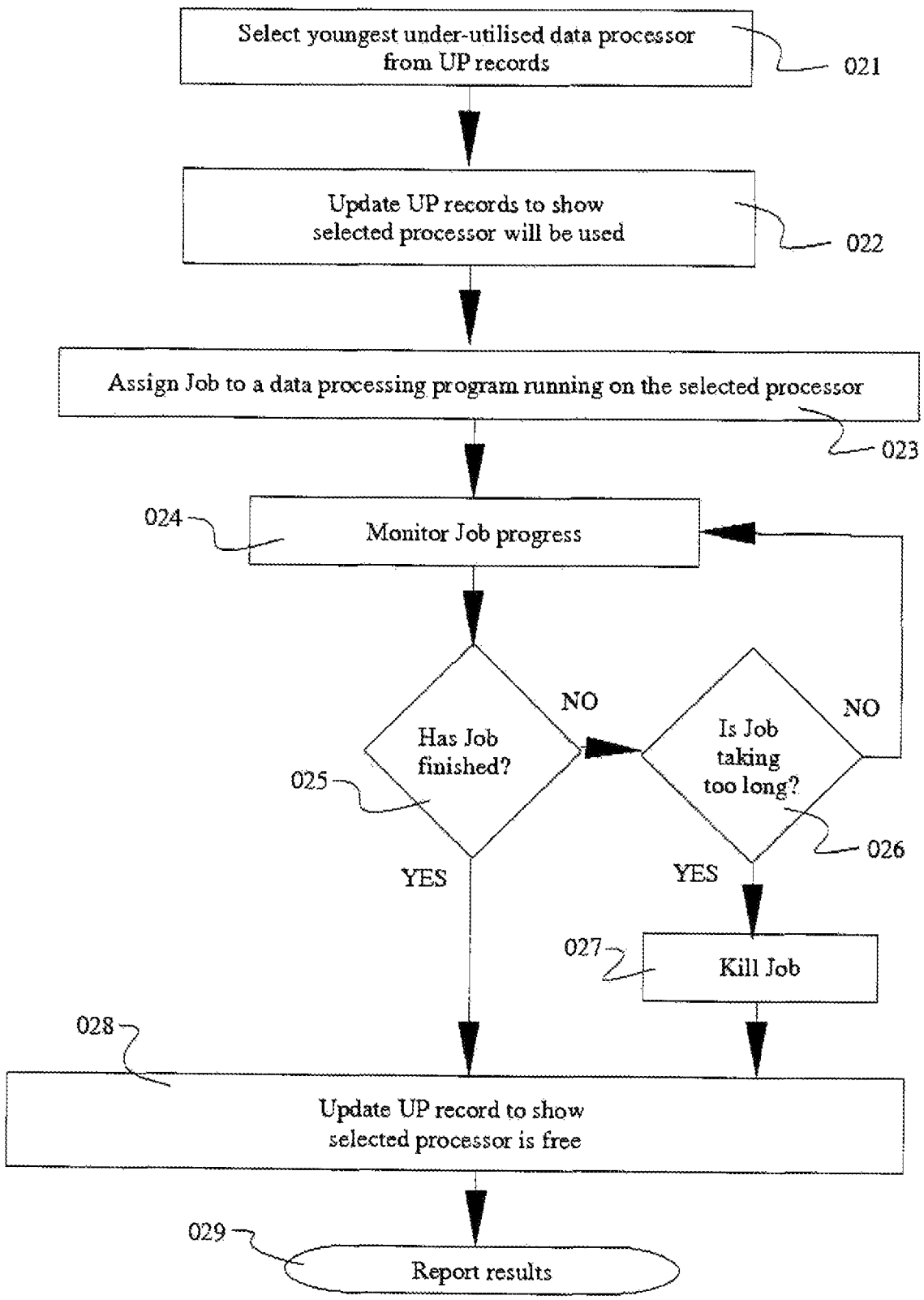

In FIGS. 5 and 6 of the drawings appended to this specification are shown flow-charts exemplifying the invention as residing in a method.

In FIG. 1 is shown an embodiment of the invention with Pool Manager 001 having an underutilised processor creation threshold 002, as denoted as "UP/C", set to a value of 2. This means when there are only two or less under-utilised processors in a Pool of Virtual Environments, Pool Manager 001 will cause a new Virtual Computing Environment to be created to expand the number of idle processors in the pool able to process Jobs. In this example, Pool Manager 001 can also destroy underutilised Virtual Computing Environments. For this purpose, Pool Manager 001 has an underutilised processor destruction threshold 003, as denoted as "UP/D", which is set to a value of 5.

It will be appreciated that in an operational setting these UP/C and UP/D values would typically be much higher but are set to low values in this example to illustrate the operation of Pool Manager 001. It will also be appreciated that a Pool Manger could reside wholly or partly in a Virtual Computing Environment, which could if desired, be part of a Pool of Virtual Environments.

The embodiment exemplified in FIG. 1 shows a four-processor Virtual Computing Environment 004 and a two-processor Virtual Computing Environment 005 in Virtual Computing Environment Pool 006. Each bar seen in these Virtual Computing Environments represents a processor; the black bars representing a utilised processor and a white bar representing an underutilised processor in Virtual Computing Environment 004 at the present moment in this example. The different sizes of the bars between Virtual Computing Environments 004 and 005 denote higher power processors with the taller bars.

The embodiment exemplified in FIG. 1 also shows a Job Concentrator 007 with means depicted by broken line 008 for allocating a Job to be allocated to the youngest under-utilised data processing program, in this case running on a processor in Virtual Computing Environment 004. Such means could involve for example, the Trivial File Transfer Protocol known to the art or a number of other file transfer protocols, or IP sockets as another means of data transfer. It will be appreciated that these examples are given to illustrate the Job allocation means rather than limit the invention to a particular style of programming or application configuration. It will be further appreciated that like a Pool Manger, Job Concentrator 007 could reside wholly or partly in a Virtual Computing Environment, which could if desired, be part of a Pool of Virtual Environments.

It can be seen that in the example embodiment of FIG. 1, Virtual Computing Environment 004 bears a "VCE(0)" label, while Virtual Computing Environment 005 bears a "VCE(1)" label. The bracketed numbers in the VCE label denote the order of Virtual Computing Environment creation. So at the present moment in this example, Virtual Computing Environment 004 is the earliest created, yet Job Concentrator 007 will still allocate it a Job since Virtual Computing Environment 004 has the only underutilised processor available.

In this example embodiment, Job Concentrator 007 can determine where to allocate Jobs based on information about the status of processors and/or data processing by means of messaging system 009. Messaging system 009 is used to transmit reports on processor and/or data processing status to Pool Manager 001 and Job Concentrator 007. These reports could be generated by the data processing programs for example. Although the arrows in messaging system 009 show information flows towards Pool Manager 001 and Job Concentrator 007, it will be appreciated that these reports could be triggered by a request transmitted via messaging system 009 or another mechanism, such as an IP socket connection.

It will be further appreciated however, that in an alternative embodiment to FIG. 1, a Job Concentrator could obtain information by for example, polling a monitoring software agent running in one or more Virtual Computing Environments. Thus it is not intended the description of the operation of messaging system 009 should limit the invention to any particular method of communication between any Virtual Computing Environment and any Pool Manager or Job Concentrator, or indeed, any data processing program. Furthermore, similar to a Pool Manger or Job Concentrator, message system 009 could reside wholly or partly in a Virtual Computing Environment, which could if desired, be part of a Pool of Virtual Environments.

At the present moment in the exemplary embodiment shown in FIG. 1, there are insufficient underutilised processors—with only one available within the Pool as denoted by the white bar in Virtual Computing Environment 004. This is lower than the threshold value of 2 underutilised processors 002 as seen in Pool Manager 001. Therefore Pool Manager 001 will cause a new Virtual Computing Environment to be created. This could be carried out by means of an API call to a hypervisor to clone a Virtual Computing Environment acting as a template or by running script(s) to create a new Virtual Computing Environment for the Pool.

Figure 2:
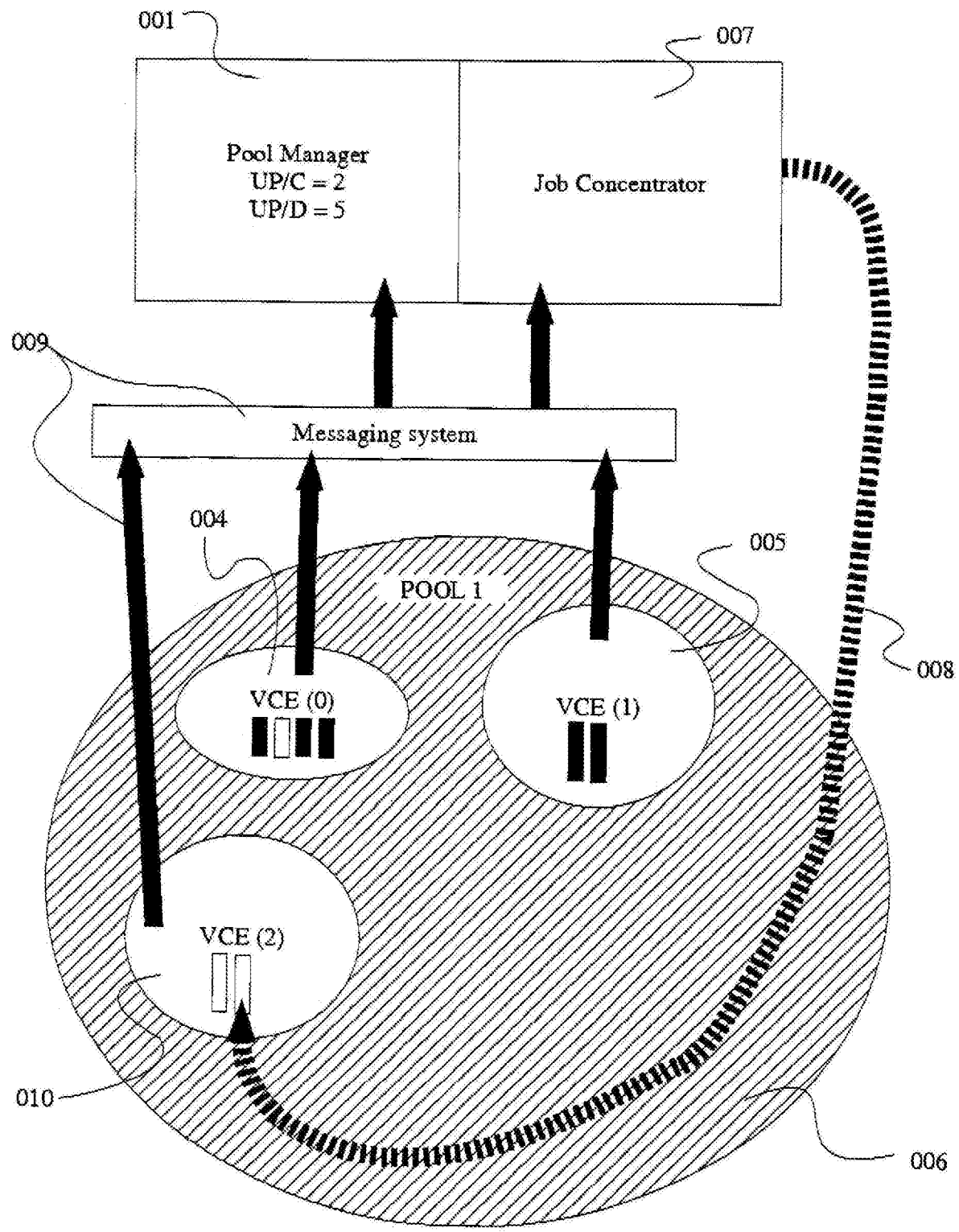

FIG. 2 depicts the exemplary embodiment of FIG. 1 at a later moment in time, after a new Virtual Computing Environment 010 has been created by the action of Pool Manager 001 and added to Pool 006. In this example, Virtual Computing Environment 010 has been created from the same template or script(s) as Virtual Computing Environment 005, and is connected to messaging system 009. By way of processor and/or data processing status information transmitted via messaging system 009, Job Concentrator 007 has determined that the youngest created processor for the next Job to be allocated via Job allocation means 008 is located in the newly created Virtual Computing Environment 010. The example also shows an underutilised processor is available in Virtual Computing Environment 004.

Figure 3:
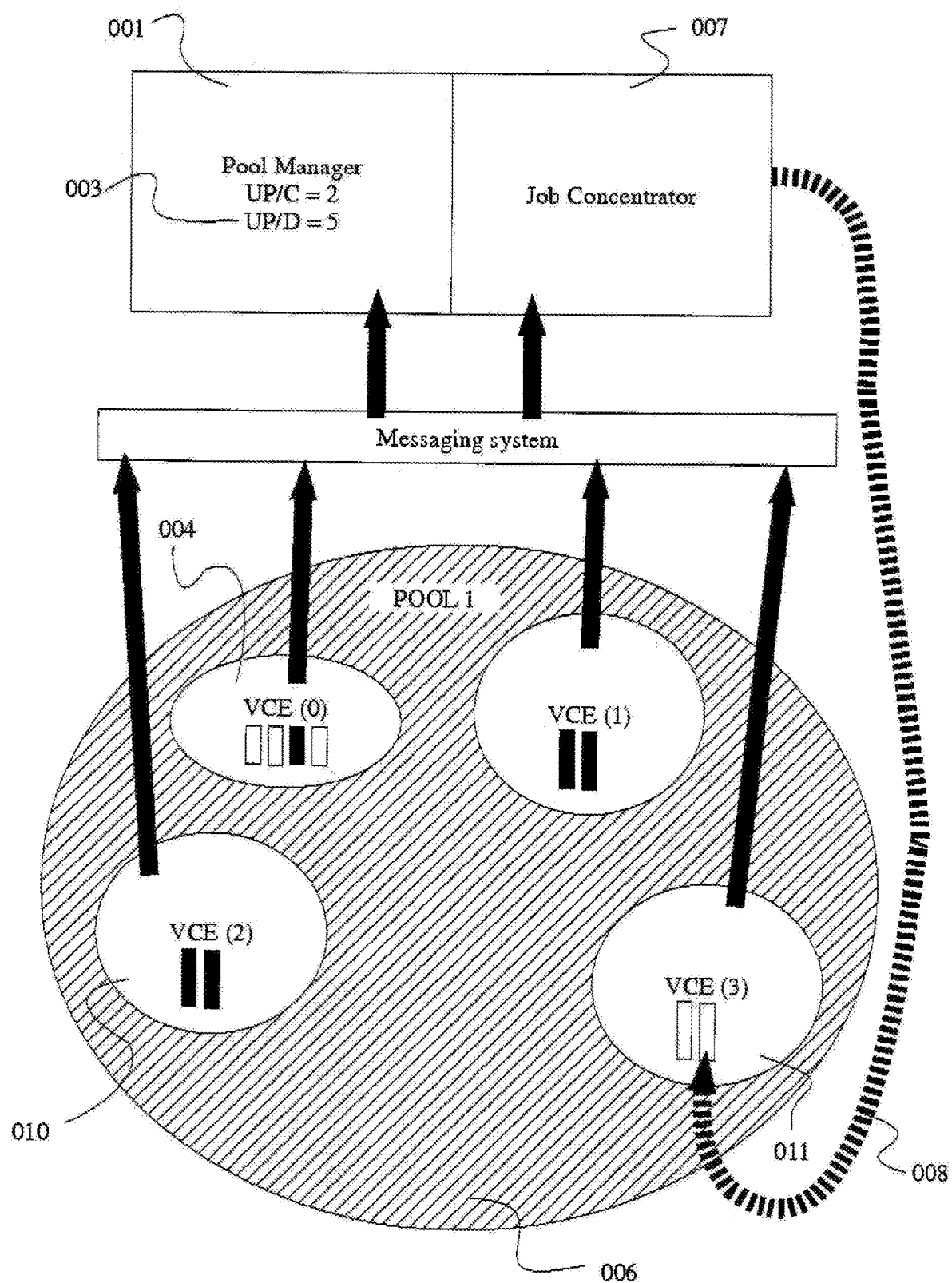

FIG. 3 depicts the exemplary embodiment of FIG. 2 at a later moment in time, after a new Virtual Computing Environment 011 has been created by the action of Pool Manager 001 and added to Pool 006. Virtual Computing Environment 010 is fully utilised now while Virtual Computing Environment 004 has three underutilised processors. In the same manner as in FIGS. 1 and 2, Job Concentrator 007 has determined that the youngest created processor for the next Job to be allocated via Job allocation means 008 is located in the newly created Virtual Computing Environment 011. Since the number of underutilised processors is now 5, the underutilised processor destruction threshold 003 has been reached. However Pool Manager 001 is unable to cause Virtual Computing Environment 004 labeled VCE(0) to be destroyed as the oldest computing environment, because not all of its processors are underutilised.

Figure 4:
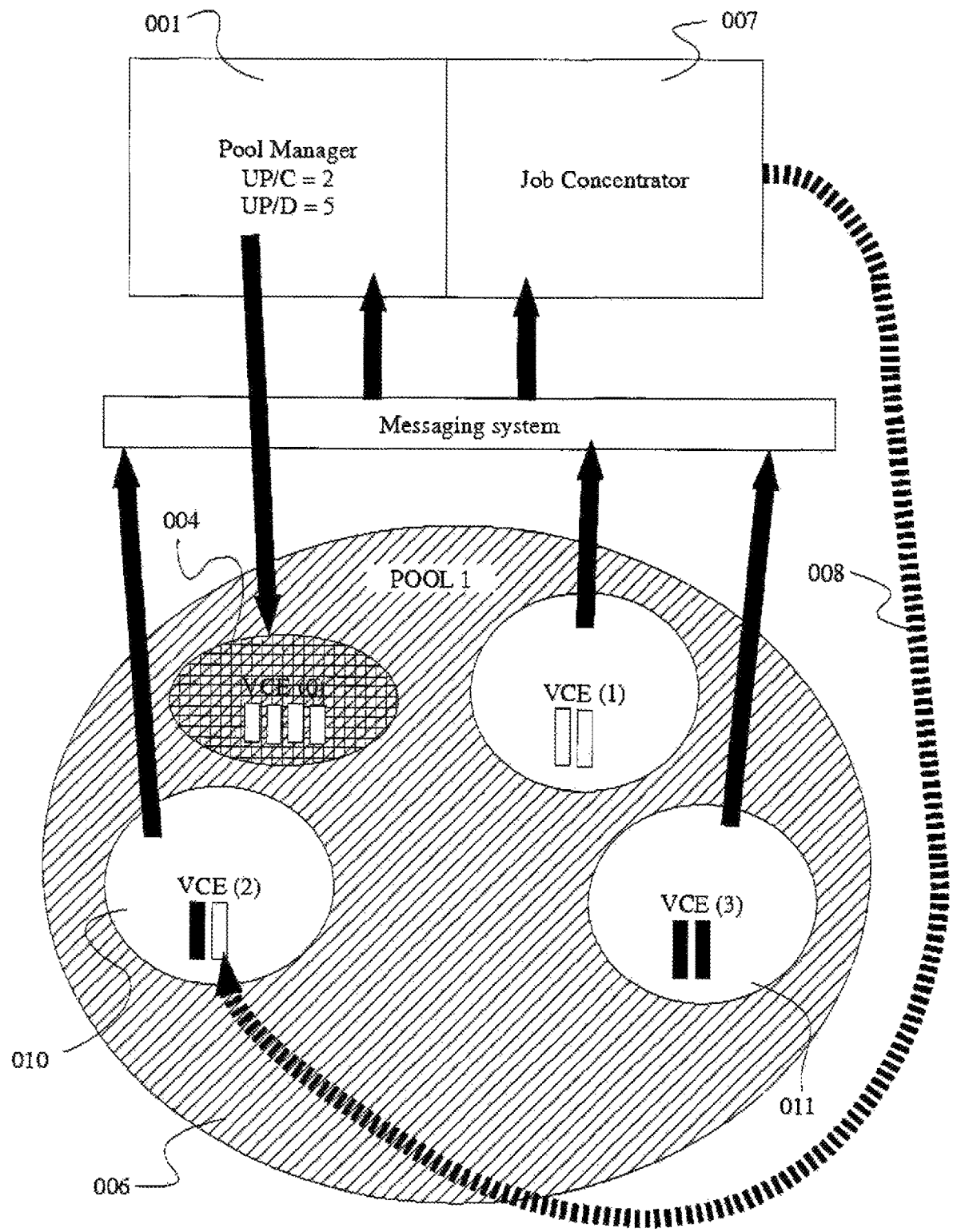

FIG. 4 depicts the exemplary embodiment of FIG. 3 at a later moment in time, as Virtual Computing Environment 004, being the earliest created (i.e. VCE(0)), is destroyed by the action of Pool Manager 001 upon Pool 006. In so doing, Pool 006 has been updated to run only two-processor Virtual Computing Environments each with higher powered processors than the defunct four-processor Virtual Computing Environment 004. This occurred after all processors in Virtual Computing Environment 004 became underutilised and when no Job was being processed there. In the same manner as in FIGS. 1, 2, and 3, Job Concentrator 007 has determined that the youngest created processor for the next Job to be allocated via Job allocation means 008 is located in Virtual Computing Environment 010. This is because the younger option of Virtual Computing Environment 011 is presently fully utilised in this example.

In a preferred embodiment, a Job Concentrator would be informed of the status and/or progress of Jobs by the data processing application to which the job has been allocated. Without limitation, this could be achieved using a messaging system such as that described in FIGS. 1 to 4.

In a preferred embodiment, data processing applications also register their availability upon start-up with at least one Job Concentrator. Without limitation, this could be achieved using a messaging system such as that described in FIGS. 1 to 4.

FIG. 5 shows an exemplary flow diagram of an embodiment of the Virtual Computing Environment management aspect of the invention. In step 012 the number of underutilised processors ("UP") available for data processing is ascertained. In step 013 underutilised processor creation threshold ("UP/C") and undertutilised processor destruction thresholds ("UP/D") are ascertained.

In step 014 the number of underutilised processors (UP) is compared with the underutilised processor creation threshold (UP/C). If the underutilised processor creation threshold (UP/C) is greater than or equal to the number of underutilised processors (UP) then a new Virtual Computing Environment is created in step 019, the number of underutilised processors (UP) is updated in step 020 for the purposes of step 021 in the sequence exemplified in the embodiment of FIG. 6. Then, after the interval of step 016 of FIG. 5 is complete, the sequence of FIG. 5 starts over at step 012.

If on the other hand at step 014 the underutilised processor creation threshold (UP/C) is less than the number of underutilised processors UP, then at step 015 the number of underutilised processors ("UP") is compared with the underutilised processor destruction threshold ("UP/D"). If the underutilised processor destruction threshold (UP/C) is less than or equal to the number of underutilised processors (UP) and the oldest Virtual Computing Environment ("VCE") is not running any Job(s), then the number of underutilised processors (UP) is updated in step 017 for the purposes of step 021 in the sequence exemplified in the embodiment of FIG. 6. After that, that oldest Virtual Computing Environment is destroyed in step 018. Then after the interval of step 016 of FIG. 5 is complete, the sequence of FIG. 5 starts over at step 012.

However if the if the underutilised processor destruction threshold (UP/C) at step 015 is greater than the number of underutilised processors (UP) or the oldest Virtual Computing Environment ("VCE") is still running any Job(s), then after the interval of step 016 of FIG. 5 is complete, the sequence of FIG. 5 starts over at step 012.

In a preferred embodiment, the number of underutilised processors (UP) is ascertained by at least one Pool Manager querying at least one Job Coordinator. In another embodiment, the number of underutilised processors (UP) is ascertained by querying at least one Hypervisor or at least one management agent running in a Virtual Computing Environment. Alternatively and without limitation, a combination of these means of ascertaining the number of underutilised processors (UP) could be employed.

In a preferred embodiment the determination of what is the oldest Virtual Computing Environment will be made by a Pool Manager querying a Job Concentrator; although hypervisor(s) or management agent(s) running in a Virtual Computing Environment could be queried directly in an alternative embodiment. Alternatively and without limitation, a combination of these means could be employed to determine what is the oldest Virtual Computing Environment.

In a preferred embodiment the determination of whether the oldest Virtual Computing Environment is still running any Job(s) will be made by a Pool Manager querying a Job Concentrator, although data processing applications could be queried directly in an alternative embodiment. In another alternative embodiment, the absence of Job(s) running in a Virtual Computing Environment could be ascertained by detecting low processor utilisation after querying hypervisor(s) or management agent(s) running in a Virtual Computing Environment. Alternatively and without limitation, a combination of these means could be employed to determine whether the oldest Virtual Computing Environment is still running any Job(s).

It will be appreciated that it is not intended by the above description to limit the means of ascertaining or determining the number of underutilised processors, what is the oldest Virtual Computing Environment, and/or whether the oldest Virtual Computing Environment is still running any Job(s). The invention may work just as well using any other means of determining or ascertaining this information.

It will be further appreciated that FIG. 5 is not the only order in which the steps could be performed. For example, although less efficient, it would be possible to resequence the steps so that 015 and its associated steps 017 & 018 was performed before step 014 and its associated steps 019 & 020.

FIG. 6 shows an exemplary flow diagram of an embodiment of the Job allocation aspect of the invention. In step 021 the most underutilised processor (UP) is ascertained and in step 022 underutilised processor record(s) are updated to show this processor ("the selected processor") is being used. (This information is used in step 012 of the example embodiment of FIG. 5 to help determine Virtual Computing Environment creation and destruction.) A Job (such as but not limited to document reformatting or data compression) is then assigned to a data processing application running on the selected processor in step 023. The progress of the Job is monitored in step 024. Steps 025 and 026 check if the Job has finished or if it is taking too long. If the Job has neither finished nor has taken too long to process, monitoring of the Job is continued in step 024. If the Job has finished then the selected processor is recorded as being free in step 028 and a Job report is generated in step 29 to record the outcome of data processing. If on the other hand, the Job is taking too long (e.g. is a document of 2000 words with 5 pictures and has so far taken 5 seconds to reformat) then the Job is killed in step 027 and a Job report is generated in step 29 to record the outcome of data processing.

It will be appreciated that a delay may be needed (e.g. yield to other processes) in the monitoring step 024 to avoid excessive processor usage.

FURTHER DESCRIPTION OF THE INVENTION

It be appreciated that underutilised processor creation threshold ("UP/C") and undertutilised processor destruction thresholds ("UP/D") may be set by manually (in whole or in part) to balance the cost of running underutilised processors against the performance of immediate Job processing.

In a preferred embodiment, the Job allocation aspect of the invention will be undertaken by a Job Concentrator.

In a preferred embodiment, the last-started data processing application that is free to take a Job could stand proxy for the youngest underutilised processor. In this case the underutilised processor UP record(s) include data processing application instance information. This arrangement may allow several data processing applications to run on the same processor.

It will be appreciated that a Pool may or may not correspond to a group of Virtual Computing Environments located on servers in a particular server farm.

In a preferred embodiment, Pools may be located in different clouds in different locations to increase the availability of the system such as when one part of the Internet goes down.

The invention provides an automated way of providing object pool-like guarantees to jobs handled by applications running within in one or more pools of virtual computing environments, which can take advantage of the economies and benefits of cloud computing's scaling out and aggregation, while also taking into account maintenance issues and the need to cycle such systems over time while maintaining continuous throughput; and can achieve this while keeping the 'noise' down so as to avoid the expense of high performance private clouds and the delays of bare metal provisioning. In doing so, the system method process may provide cheaper processing for applications such as document reformatting and data compression through more efficient and flexible hardware untilisation.

The invention claimed is:

1. A data processing system within a computing environment for managing one or more Pools of Virtual Computing Environments and distributing jobs to a plurality of Virtual Computing Environments, the data processing system comprising:
at least one Pool Manager means that can cause the creation or addition of one or more Virtual Computing Environments to be included in a said Pool, with said creation/addition function(s) triggered when the number of under-utilized processors in said Pool is less than a threshold for such under-utilized processors;
one or more Job Concentrator means which allocates jobs to said Virtual Computing Environments in said Pool, whereby said allocation is made to a Virtual Computing Environment having one or more under-utilized processors, with said allocation made in an order of priority from the latest added Virtual Computing Environment, to the earliest added Virtual Computing Environment;
at least one Pool Manager means that can cause the destruction or removal or of said Pool's earliest added Virtual Computing Environment in which every processor is under-utilized and not processing any jobs, wherein said destruction/removal function(s) are triggered when the number of under-utilized processors in said pool is more than a threshold for such under-utilized processors;
wherein an under-utilized processor is a processor within a Virtual Computing Environment that is able to process a job, that does not have a job or that has an amount of free time predetermined or calculated as being enough to process one or more additional jobs;
wherein a threshold of under-utilized processors is a number or certain numbers of said under-utilized processors or a range of numbers of said under-utilized processors;
wherein the Pool Manager means ascertains or determines the number of under-utilized processors, the age of the Virtual Computing Environments, and any jobs running within the Virtual Computing Environments;
wherein the jobs allocated by said Job Concentrator means are data processing jobs to be run in the Virtual Computing Environments; and
wherein said Job Concentrator means and said Pool Manager means are implemented in software running within the computing environment.

2. The system of claim 1 wherein said Job Concentrator means allocates jobs to Virtual Computing Environments determined or calculated as being suitable for that job.

3. The system of claim 1 wherein the earliest added Virtual Computing Environment is the earliest added Virtual Computing Environment of a certain class of Virtual Computing Environments but not necessarily the earliest Virtual Computing Environment in said Pool.

4. The system of claim 1 wherein said Pool Manager means may determine that a Virtual Computing Environment to be created/added to said Pool will be of a certain class.

5. The system of claims 2, 3, and 4 combined.

6. A method of allocating data processing jobs to Virtual Computing Environments and automatically adjusting the number of Pool-based Virtual Computing Environments, including the steps of:
   checking if the number(s) of under-utilized is less than a desired threshold for under-utilized processors, and if so, creating a Virtual Computing Environment and adding it to a Pool;
   allocating jobs to said Virtual Computing Environments in said Pool, whereby said allocation is made to a Virtual Computing Environment having one or more under-utilized processors, with said allocation made in an order of priority from the latest added said Virtual Computing Environment, to the earliest added said Virtual Computing Environment;
   checking if the number(s) of under-utilized processors is more than the desired threshold for under-utilized processors, and if so, removing or destroying the earliest added Virtual Computing Environment in said Pool that is not running any job;
   whereby an under-utilized processor is a processor within a Virtual Computing Environment that is able to process a job, that does not have a job or that has an amount of free time predetermined or calculated as being enough to process one or more additional jobs; and
   whereby a said threshold of under-utilized may be described as a number or certain numbers of said under-utilized processors or comprise a range of numbers of said under-utilized processors; and
   whereby the method is performed by a computer environment utilizing hardware, software and networking.

7. The method of claim 6 whereby the job allocation step allocates jobs to Virtual Computing Environments that are determined or calculated as being suitable for that job.

8. The method of claim 6 whereby the creation/addition of a Virtual Computing Environment to said Pool may be determined to be of a certain class.

9. The method of claim 6 whereby the earliest added Virtual Computing Environment is the earliest added Virtual Computing Environment of a certain class of Virtual Computing Environments but not necessarily the earliest Virtual Computing Environment in said Pool.

10. The methods of claims 7 and 8 combined.

11. A process of managing the life cycle of Virtual Computing Environments performing data processing jobs, wherein:
   a Virtual Computing Environment is created and added to a Pool when the number of under-utilized processors is less than a threshold;
   the Virtual Computing Environment is allocated jobs when it has one or more under-utilized processes and there are no other Virtual Computing Environments in the Pool also with one or more under-utilized processes that were added to the Pool after the Virtual Computing Environment;
   the Virtual Computing Environment is removed from the Pool and/or destroyed when it is the earliest Virtual Computing Environment to have been added to the Pool and when it is not processing any job and when the number of under-utilized processes is more than a threshold;
   with the process having means for querying the number of under-utilized processors, the age of Virtual Computing Environments, and any jobs running within the Virtual Computing Environments it manages; and
   with the processes running in a computer environment utilizing hardware, software and networking.

12. The process of claim 11 wherein one or more jobs are allocated to the Virtual Computing Environment based upon its suitability to perform said jobs.

13. The process of claim 11 wherein the creation/addition of a Virtual Computing Environment to said Pool may be determined to be of a certain class.

14. The process of claim 11 wherein the Virtual Computing Environment is the earliest Virtual Computing Environment of a certain class of Virtual Computing Environments but not necessarily the earliest Virtual Computing Environment in said Pool.

15. The claims of 12, 13 and 14 combined.

* * * * *